United States Patent [19]

Kenning et al.

[11] Patent Number: 4,733,986
[45] Date of Patent: Mar. 29, 1988

[54] SPLICE PLATE FOR CABLE TRAY

[75] Inventors: James M. Kenning; William K. McErlane, both of Cincinnati, Ohio; Barry R. Schuster, Union, Ky.

[73] Assignee: Square D Company, Palatine, Ill.

[21] Appl. No.: 942,935

[22] Filed: Dec. 17, 1986

Related U.S. Application Data

[63] Continuation of Ser. No. 763,739, Aug. 8, 1985, abandoned.

[51] Int. Cl.$^4$ .................................................. F16B 5/02
[52] U.S. Cl. .................................. 403/306; 403/408.1; 52/726
[58] Field of Search .............. 403/300, 306, 309, 312, 403/337, 205, 232.1, 286, 408.1, 406.1; 52/726, 126.2; 248/300

[56] References Cited

U.S. PATENT DOCUMENTS

| 1,862,433 | 6/1932 | Ross | 403/306 |
| 2,682,321 | 6/1954 | LeBrock | 403/306 |
| 3,328,981 | 7/1967 | Smith | 52/726 |
| 3,606,418 | 9/1971 | Baker et al. | 52/726 |
| 3,938,297 | 2/1976 | Sato et al. | 403/406.1 |
| 4,021,991 | 5/1977 | Hotz | 403/408.1 |
| 4,044,517 | 8/1977 | Schroter | 52/726 |
| 4,523,417 | 6/1985 | Beastall et al. | 52/726 |

FOREIGN PATENT DOCUMENTS

| 868656 | 4/1971 | Canada | 403/408.1 |
| 2940030 | 4/1981 | Fed. Rep. of Germany | 403/205 |
| 914619 | 1/1963 | United Kingdom | 403/300 |
| 1057551 | 2/1967 | United Kingdom | 52/726 |

Primary Examiner—Randolph A. Reese
Assistant Examiner—Peter M. Cuomo
Attorney, Agent, or Firm—Larry I. Golden; Mary R. Jankousky; Richard T. Guttman

[57] ABSTRACT

An assembly for joining together end to end sections of cable tray. Each section of cable tray comprises two parallel channel siderails connected by rungs. An L-shaped splice plate has holes in the flat portion to mate with holes in the middle portion of the siderails. The splice plate has a bottom flange with studs that are inserted into respective holes on the bottom portion of the cable tray siderails.

3 Claims, 11 Drawing Figures

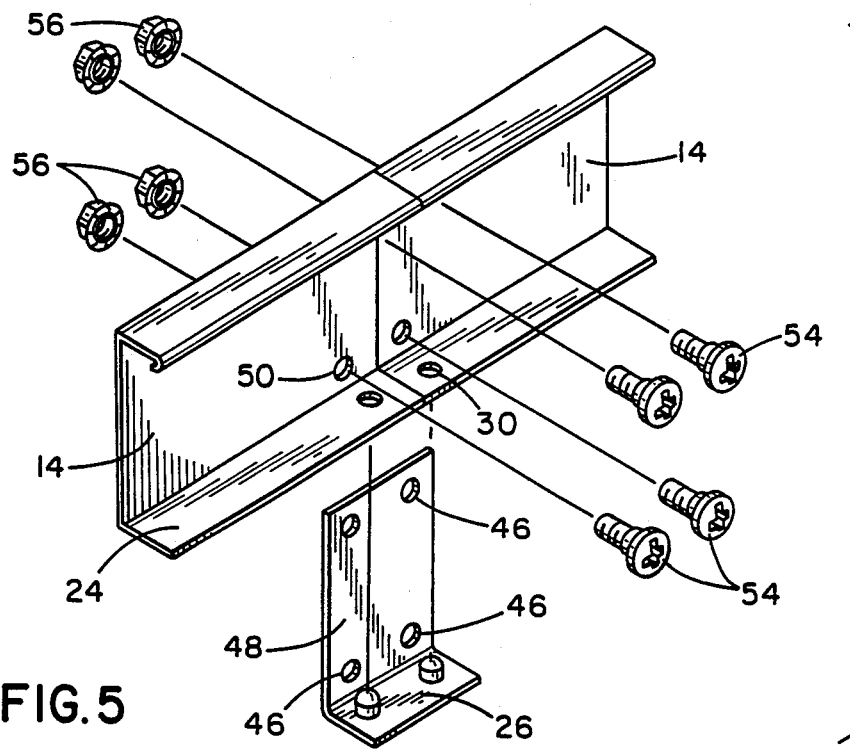
FIG. 5
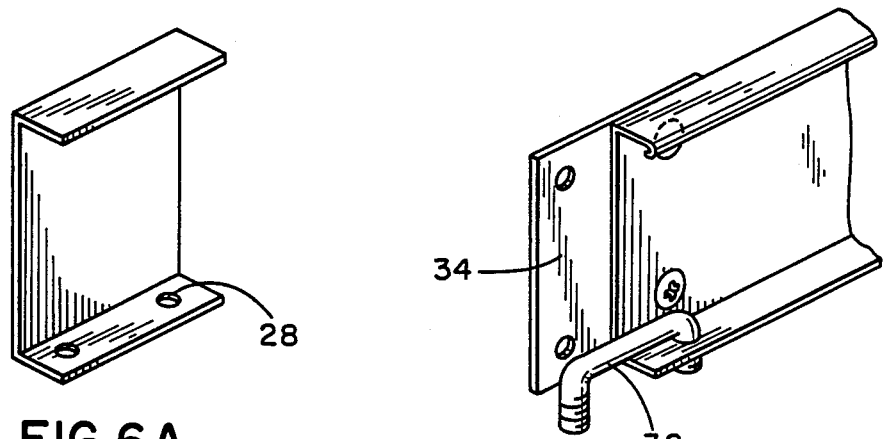
FIG. 6A
FIG. 6B
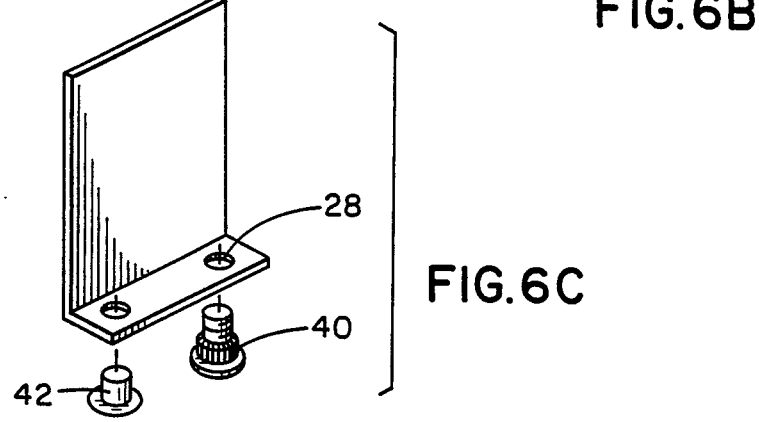
FIG. 6C

SPLICE PLATE FOR CABLE TRAY

This application is a continuation Ser. No. 763,739, filed on 8/8/85, now abandoned.

FIELD OF THE INVENTION

This invention relates to a cable tray for supporting electrical cables and is more particularly directed to an improvement in a splice plate joining two sections of cable tray.

DESCRIPTION OF THE PRIOR ART

Cable trays are used to support runs of electrical cable in indoor and outdoor applications. The cable tray is manufactured in sections and is joined end to end by splice plates. Often a large number of cables are supported by a single cable tray, causing the cable tray to bend at the joint between two sections of cable tray, as shown in FIG. 2B.

The early splice plates were flat as shown in FIG. 3A. To prevent sagging at the joint connections between sections of cable tray, channel edges were added to later splice plates, as shown in FIG. 3B. This type of splice plate still allows significant sagging at the joints.

To prevent the sagging at the joint connections, additional bolts may be supplied to connect the splice plates to each of the cable tray sections as shown in FIG. 3C. The use of additional bolts is time consuming because of the large number of cable tray sections in the electrical distribution systems of some manufacturing facilities. Also the bolts are easily misplaced.

There is a need for an easy to assemble splice plate that provides a strong connection between adjacent cable tray sections.

SUMMARY OF THE INVENTION

It is an object of this invention to provide a cable tray assembly that is strong and significantly reduces sagging at the joints.

It is another object of this invention to provide an easy to assemble cable tray splice plate that uses a minimum number of bolts or other connectors.

Other objects and features of the present invention will become apparent upon examination of the following specification and claims together with the accompanying drawings.

These objects are accomplished by the splice plate of the preferred embodiment of the present invention which includes an L-shaped plate sized and dimensioned to overlap the ends of two adjacent sections of cable tray. The plate has two studs in the bottom flange of the siderail. Four holes are supplied in the flat portion of the splice for connection to the cable tray sections by bolts or other connectors.

The studs on the bottom flange are located at the optimum location to oppose the tensile force caused by the weight of the cables. In addition to providing extra strength to the joint, the studs in the splice simplify the installation of the cable tray by aligning the holes in the ends of adajcent cable tray sections.

BRIEF DESCRIPTION OF THE DRAWINGS

FIG. 5 is an exploded view of cable tray siderail sections joined by the splice plate of FIG. 4.

FIG. 6A is a perspective view of a channel member splice plate having bolt holes through the bottom flange.

FIG. 6B is a perspective view of a flat splice plate and a finger splice on the bottom flange of a cable tray siderail.

FIG. 6C is a perspective view of an L-shaped splice plate having holes on the bottom flange for use with a bolt or drive rivet.

DETAILED DESCRIPTION OF THE PREFERRED EMBODIMENT

Figure 1:
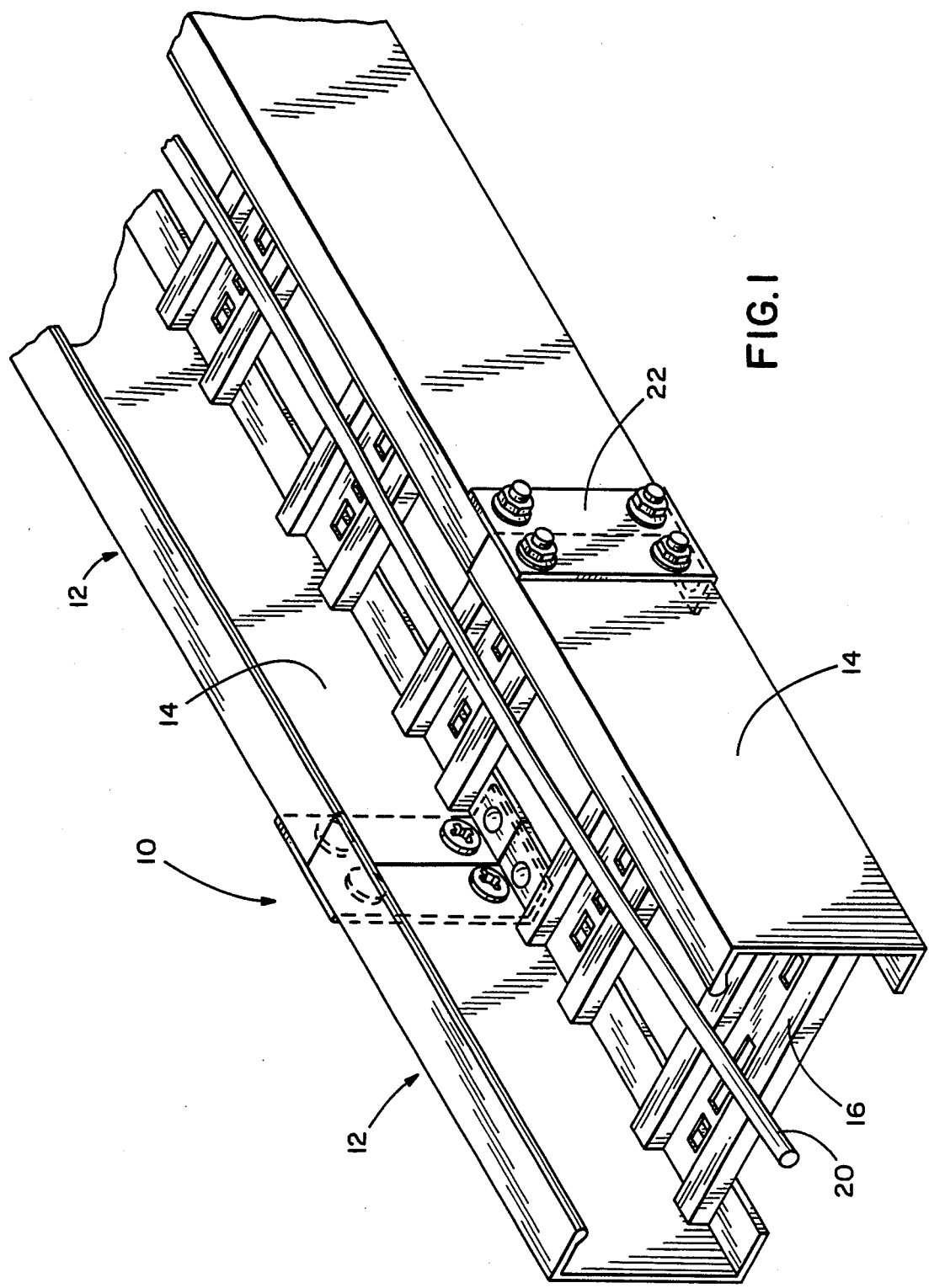
FIG. 1 is a perspective view of the preferred embodiment of the subject invention showing the splice plate joining two adjacent sections of cable tray.

Referring now to FIGS. 1 and 5, the preferred embodiment of the cable tray assembly is indicated generally as numeral 10. Each cable tray section 12 comprises two parallel siderails 14 joined by rungs 16. Cables 20 are supported by the rungs 16 with the entire cable tray assembly being positioned overhead, for example in a manufacturing facility, by a support 18 from the ceiling, wall or other object.

Figure 2A:
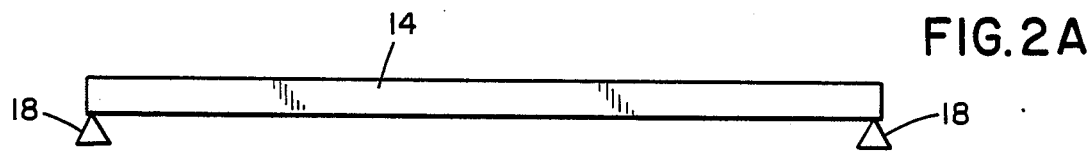
FIG. 2A is a sketch of the side view of two cable tray sections showing the support forces acting on the cable tray.
Figure 2B:
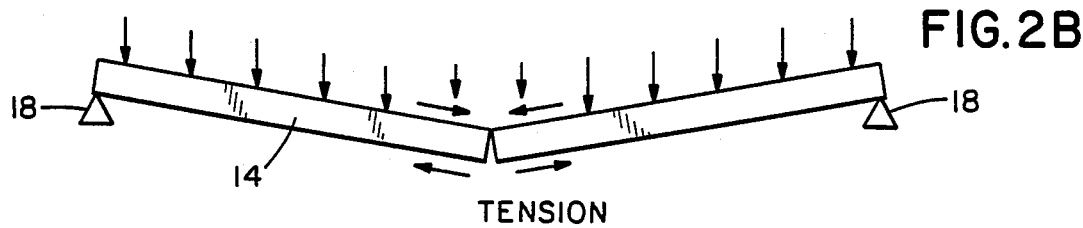
FIG. 2B is a sketch of the side view of two cable tray sections showing the forces acting on the tray due to the weight of the cable and the supports.
Figure 3A:
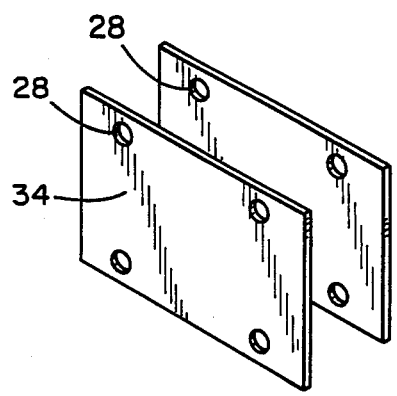
FIG. 3A shows a perspective view of a flat splice plate.
Figure 3B:
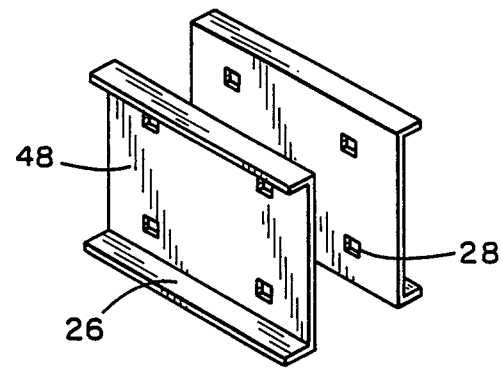
FIG. 3B shows a perspective view of a channel splice plate.
Figure 3C:
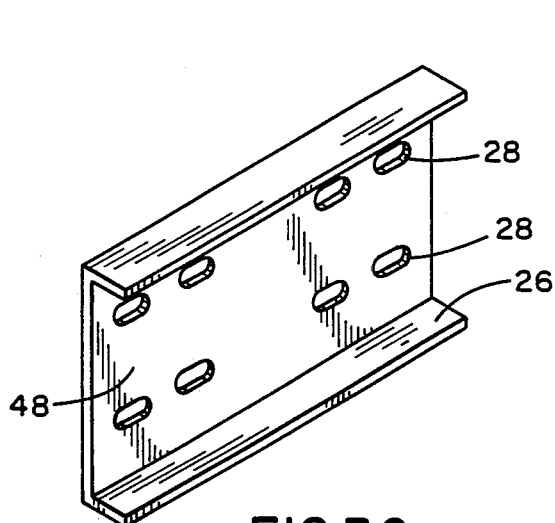
FIG. 3C shows a perspective view of a channel splice plate that uses eight bolts or other connectors.

The cable tray sections 12 are placed in longitudinal end to end relationship and are joined by a splice plate 22. As shown in FIG. 2B, the weight of the cables exerts a downward force on the cable tray section which is opposed only by the upward force of the support 18. This causes a tensile force at the bottom portion 24 of the siderail 14 near the joint between two cable tray sections, causing the cable tray sections to separate.

Figure 4:
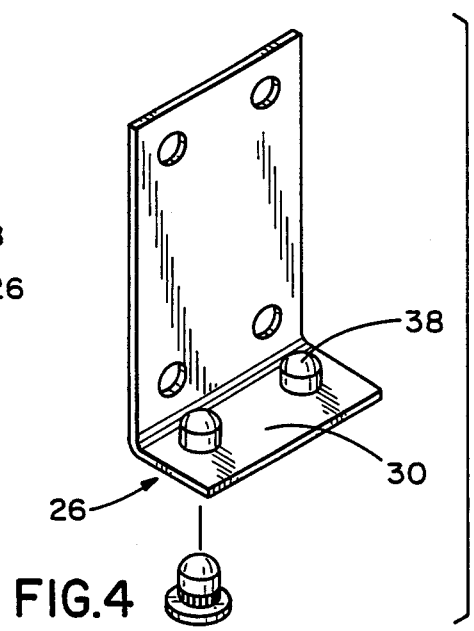
FIG. 4 is a perspective view of an L-shaped splice plate that is the subject of the present invention.

The present invention overcomes this problem by providing a support means in the splice plate at the location of the maximum tensile stress. The preferred embodiment, as shown in FIG. 4, includes an L-shaped splice plate 22 having studs 38 on the bottom flange 26. The splice plate is to be positioned over the outside of the cable tray side rails 14, as indicated in FIG. 5.

Alternate embodiments of the present invention are shown in FIGS. 6A through 6C. Each of the splice plates shown in FIGS. 6A, 6B and 6C requires that the bottom portion 24 of each siderail have a hole 30 to mate with the various connectors, as well as holes 50 in the middle portion 52. FIG. 6A shows a channel shaped splice plate having two openings 28 in the bottom flange 26 to provide for insertion of a bolt or other connector through the bottom flange of the splice plate and the bottom portion 24 of the siderail 14. FIG. 6B shows a finger splice 32 fastened to the bottom portion 24 of adjacent cable tray sections. FIG. 6C shows an L-shaped splice plate having two openings 28 for insertion of a spline bolt 40 or drive rivet 42 to support the bottom portion 24 of the cable tray.

Each of the embodiments discussed above also includes four openings 46 on the flat portion 48, or on the flat plate 34 in FIG. 6B, of the splice for mating with respective holes 50 on the siderail 14. These four openings 46 lend additional support to the joint between sections of cable tray via splice bolts 54 and splice nuts 56.

The assembly of the sections of cable tray is simplied by using a splice with pre-positioned studs 38, such as in the preferred embodiment. By placing the studs 38 in the respective holes 30 of the bottom portion 24 of the siderail, the adjacent sections are properly aligned for placing the bolts 54 through the respective splice openings 46 and siderail holes 50.

By using studs 38 on the bottom flange 26 and four openings 46 on the flat portion of the splice 22, the preferred embodiment of the present invention has the strength of six bolts while only requiring the assembly of four bolts. This provides a significant savings in cost and time during the assembly of the cable tray system.

While the invention has particularly been shown and described with reference to a preferred embodiment, it will be understood by those skilled in the art the variations and form, construction and arrangements may be made therein without departing from the spirit and scope of the invention. All such variations are intended to be covered in the appended claims.

We claim:

1. A connecting assembly joining together a first cable tray siderail and a second cable tray siderail in longitudinal end to end relationship, said first siderail and said second siderail each including a middle portion and a bottom portion, each middle portion and each bottom portion having at least one hole adjacent the end to be joined, said assembly comprising:
   a generally L-shaped splice plate having a flat portion and a bottom flange;
   a plurality of openings in the flat portion, each of said openings being positioned in registration with a respective hole in the middle portion of said first siderail and said second siderail;
   a plurality of connectors, each connector passing through a respective one of said holes in the middle portion of said first siderail or said second siderail and a respective one of said openings in said flat portion; and
   a plurality of studs pre-positioned on said bottom flange, each stud protruding upwards and being fittingly received through a respective one of said holes in the bottom portion of said first siderail and said second siderail.

2. The connecting assembly of claim 1 wherein said first siderail and said second siderail each comprise a C-shaped channel and said splice plate is positioned outside the channels.

3. The connecting assembly as claimed in claim 1 wherein said middle portion of both said first siderail and said second siderail each have two holes and said flat portion of said splice plate has four openings.

* * * * *